Patented Feb. 1, 1927.

1,615,876

UNITED STATES PATENT OFFICE.

HANS JENSEN, CHARLES E. SALSBERY, AND GUY G. GRAHAM, OF KANSAS CITY, MISSOURI.

PROCESS OF PRODUCING ANTHRAX AGGRESSIN.

No Drawing.  Application filed July 19, 1926.  Serial No. 123,538.

This invention relates to the production of anthrax aggressin and has for its object to produce a process of extracting commercial quantities and the treating of fluid exudate derived from the body of an animal which has died from the disease known as anthrax. The process is, as follows:

First, we take a perfectly normal horse or mule without regard to age, and a virulent culture of anthrax. We inject the anthrax culture suspended in a liter of fluid into the pleural cavity of the animal. This injection into the pleural cavity may be done on both sides of the animal covering a large area of the wall of the pleural cavity, which sets up an immediate irritation over a large area and consequently we get just that much more effect and this method also produces a much larger exudate. The animal is then allowed to succumb, its death ensuing within the prescribed period of forty-eight to seventy-two hours. If it does not die within that time we do not use the exudate material. The reason for only using the fluid from animals that die within the prescribed period of time above mentioned is that we have found by experiment that if the animal dies at a later period, the fluid exudate does not possess as high a protective power as the fluid drawn from animals that die between forty-eight and seventy-two hours. The virulence of the organisms injected into the animal is important, as the fluid exudate is not satisfactory unless obtained from an animal whose death occurs within forty-eight to seventy-two hours. If you insert the required number of organisms into the pleural cavity suspended in a small quantity of fluid, you do not get as large a distribution of the anthrax germs in the pleural cavity, and do not cover such a large surface of the cavity and do not set up a surface irritation to the same extent as where a liter of fluid is injected into the cavity which produces an irritation over a larger area and consequently produces death in a much shorter time and also produces more exudate and of a more virulent character. After this virulent culture of anthrax is injected into the animal, we observe each animal closely from the time it is injected, and take the temperature of the animal daily, and if on the morning of the second day we find the case is not progressing rapidly enough to kill within seventy-two hours, we give a second inoculation to produce the desired effect. The object in killing the animal in this length of time is that we have found by experiment that the exudate from an animal which dies within seventy-two hours after injection is much more effective in the prevention of the disease than if the horse or mule lingers along for a number of days. It has been a common idea that the longer an animal lives the more exudate will be produced and not only that alone, but in addition to making more exudate it would make a more potent and virulent product, but on experimentation we have found the reverse to be true. As soon as the animal dies it is partly placed in an incinerator leaving enough of the animal accessible so that we can still do the work of removing the fluid exudate. If any of this fluid should escape from the opening made into the pleural cavity it will run into the incinerator and not upon the floor of the room. We have prepared a nickel plated brass tube about twenty-eight inches long, having at one end a blunt pointed tip with a number of small holes through the sides of it. A heavy walled rubber tubing is attached to the upper end of this nickel plated brass tube and this rubber tubing is carried over and attached to a container, which is usually a gallon bottle, into which the material is to be drawn. This gallon bottle is fitted with a two-hole rubber stopper and through each hole there is a metal tube. The nickel plated brass tube is attached to one of these brass tubes and attached to the other metal tube is a second rubber tubing connected with a water suction pump. As soon as an incision is made and the brass tube is inserted into the pleural cavity of the animal we start the suction pump and pump the air out of the container and as soon as the air has been taken out of the container the atmospheric pressure will equalize itself by sucking the fluid out of the body of the animal into the container. We draw 2700 c. c. of the fluid into each container. As soon as this amount of fluid is drawn into a container we remove the connections and make the same connections with another container and by the use of the suction pump pump out the remainder, if any, of the fluid exudate that remains in the pleural cavity of the animal. These containers are immediately set aside and enough sodium citrate is immediately added to make a one per cent solution. Then we put in a vented rubber stopper with a hole in it and through that hole there is a glass tube about six inches long. This tube is inserted in this rubber stopper in order that these containers may be covered entirely in hot water and we use this glass tubing in order to have the containers closed so the water cannot run into them and in order to keep these containers from blowing up when pressure is generated on the inside from the heat. By reason of these glass tubes the steam and pressure is allowed to escape so the containers will not burst by reason of the generation of steam pressure on the inside. The upper part of this glass tube is always left out of the water and furnishes a vent for the expansion on the inside. The temperature of the water when the bottles are put in is just the room temperature or hydrant temperature of water. The water must be of sufficient depth to cover the entire container and stoppers and extend above part way on the glass tube. Then the burners under the tank are lighted and the water is heated to 55° centigrade. We do not start taking the time on this heating until fifteen minutes after it has been up to 55°, because we have found from experimentation that it takes approximately fifteen minutes longer to get the temperature of the contents on the inside of the containers the same as the temperature of the water on the outside. For instance, if we find that the water in the container on the outside is 55° at ten o'clock, we do not start reckoning the time until ten-fifteen because we have found that the temperature in the bottles requires fifteen minutes longer to get up to 55° than the water on the outside. The water on the outside is not allowed to go over 55°. The reason for this is we have found that if the water gets too hot it is liable to coagulate the exudate in the bottles or containers and thus destroy the fluid as a remedy.

This hot water sterilization is given immediately after the material is pumped from the body of the animal into these containers. The reason for that is that we have found that if this exudate is allowed to stand any length of time before the anthrax organisms are treated with heat, they will form spores and if the spores form in this exudate, then the degree of heat we have mentioned will not kill them and it will take a degree of heat to kill them that would coagulate the exudate into a solid mass and that would destroy it for use as aggressin, so it is essential to heat it before the spores have time to propagate. These bottles or containers should stay in the hot water tank for three hours. We have found by experimentation that three hours at that temperature will kill all the anthrax germs if this material is placed in the hot water before spores form in the fluid. The anthrax germ itself in its vegetative form is not highly resistant to heat, sunlight, drying and antiseptics, while the spore is simply a form that the organism assumes to save itself against heat, sunlight, drying and antiseptics, and the latter condition is a matter of self-preservation which nature throws around this fluid, and it is for this reason that these containers should be given this hot water bath immediately after the exudate is pumped into the containers. After we have treated this exudate with this hot water bath for three hours, the containers are then set out in a room until they cool to the temperature of the air. This takes from six to eight hours. After it has cooled the above length of time we add our preservative which is equal parts of tri-cresol and ether. These ingredients are put into this container to keep it in good condition and to preserve it in its normal state. We add enough of such mixture to make an eight tenths of one per cent solution. We have found by experiment that a larger per cent of this solution of tri-cresol and ether causes coagulation and furthermore it would be irritating to an animal when the fluid is injected into the body of the animal. We have found by experimentation that it is necessary to put only the amount above mentioned so as not to make the fluid injurious or dangerous to an animal when injected and also not to injure the fluid itself. Before we put the preservative into this fluid exudate we take a small quantity out of each container and put these samples all into one common container. In other words, we make a composite sample and from this composite sample we take a quantity and inoculate guinea pigs or rabbits. We do this to find out whether the heating above mentioned has killed all the anthrax organisms in it. If we find these animals dying from this injection of this fluid it would then have to be re-heated. But we have found in all our experiments that if the fluid is heated to the degree of heat above mentioned for the length of time mentioned, it is very efficacious and always has killed the anthrax organisms in the fluid. We have found by experimentation that the vegetative form of anthrax organisms cannot withstand the degree of heat for the above length of time than that mentioned. We have found by experiment that if anthrax organisms are actually exposed to 55° centigrade of moist heat it has killed them in from fifteen to twenty minutes and the reason we prolong the heating of the fluid for three hours is that the fluid is in large volume and probably fifteen or twenty minutes would not permit the same degree of temperature to go all through that volume of fluid. We therefore heat it for a period of three hours in order to get the temperature of the fluid raised to 55° centigrade, and when it has done so it will then have killed all the anthrax vegetative organisms in the fluid. After we have taken these sample tests above mentioned we then add this tricresol and ether above mentioned and solid stoppers are put into the containers and they are set aside in a dark place for aging. After it has gone through this process of aging, which preferably is at least ten days or more for the purpose of allowing the precipitation of all fibrine proteins or other ingredients in the liquid that are attacked by the preservative and coagulates them, this renders the liquid clear and precipitates this material to the bottom of the container. The fluid is then taken out of the containers and put into the centrifuge. The idea of this centrifuge machine is to throw out all the solid precipitates. After it is run through the centrifuge machine the fluid is then drawn into what is known as a coarse porcelain filter to get out any germ substance that could possibly be there, and after this passage through the coarser filter it is again put through a fine filter that will remove anything that has gone through the coarse filter. Then the fluid is tested for sterility, the same as all products are tested for sterility. We have found that after the fluid exudate has gone through this process of treatment it can be handled without any danger to the person handling the same and the product is then what is known as anthrax aggressin—that is the fluid contains the aggressins.

We have found by experiment that this fluid anthrax aggressin, after it has gone through this treatment, is a very effective preventive of the disease called anthrax. If a dose of five c. c. is given to a large animal such as a horse or a mule, or a dose of three c. c. for a small animal such as a sheep or a goat, before the disease of anthrax is contracted, it will prevent the animal from contracting such disease. We do not claim that this is a remedy for curing anthrax in animals, but it is a remedy for preventing the animal from getting that disease.

Heretofore there has been no process used for treating this exudate that removed danger for the person handling the animal or handling the fluid taken from the animal. The methods heretofore used in extracting this fluid have not rendered the method safe for the person doing the work. By the present method, we have removed any danger of contamination as the vegetative form of this anthrax germ is killed immediately after it is removed from the body of the animal. Heretofore other workers have treated this fluid with phenol and then the fluid was afterward heated to 45° centigrade. By heating this fluid immediately after it is removed from the body of the animal, we destroy the vegetative germs of the disease without using any chemicals and thereby avoid losing any potency of the fluid by the action of such chemicals. We have also found that the greater degree of heat that you can apply to this fluid without coagulating the same increases the potency of the fluid in its final preparation. We use no chemicals to kill the anthrax organisms in the fluid and thereby we believe we avoid any lessening of the potency of the fluid by the use of such chemicals. By heating the fluid as soon as it is removed from the body of the animal without first using chemicals, we do not get so great a precipitation of the protein matter as by using the other process.

We claim:

1. The process of producing anthrax aggressin consisting in injecting into the pleural cavity of a healthy animal a virulent culture of anthrax suspended in a liquid media in sufficient quantity to immediately infect a large area of the cavity and effect the death of the animal in from forty-eight to seventy-two hours; and effecting the withdrawal of the liquid exudate from the cavity upon the death of the animal.

2. The process of producing anthrax aggressin consisting in injecting into the pleural cavity of a healthy animal a virulent culture of anthrax suspended in a liquid media in sufficient quantity to immediately infect a large area of the cavity and effect the death of the animal in from forty-eight to seventy-two hours; effecting the withdrawal of the liquid exudate from the cavity upon the death of the animal, and adding sufficient sodium citrate solution to prevent coagulation.

3. The process of producing anthrax aggressin consisting in injecting into the pleural cavity of a healthy animal a virulent culture of anthrax suspended in a liquid media in sufficient quantity to immediately infect a large area of the cavity and effect the death of the animal in from forty-eight to seventy-two hours; effecting the withdrawal of the liquid exudate from the cavity upon the death of the animal, and heating the exudate in a water bath at substantially 55° C. to effect sterilization.

4. The process of producing anthrax aggressin consisting in injecting into the pleural cavity of a healthy animal a virulent culture of anthrax suspended in a liquid media in sufficient quantity to immediately infect a large area of the cavity and effect the death of the animal in from forty-eight to seventy-two hours; effecting the withdrawal of the liquid exudate from the cavity upon the death of the animal, heating the exudate in a water bath at substantially 55° C. to effect sterilization, and allowing the heated exudate to cool and adding equal parts of tri-cresol and ether in sufficient quantity to preserve the liquid.

5. The process of producing anthrax aggressin consisting in injecting into the pleural cavity of a healthy animal a virulent culture of anthrax suspended in a liquid media in sufficient quantity to immediately infect a large area of the cavity and effect the death of the animal in from forty-eight to seventy-two hours; effecting the withdrawal of the liquid exudate from the cavity upon the death of the animal, heating the exudate in a water bath at substantially 55° C. to effect sterilization, allowing the heated exudate to cool and adding equal parts of tri-cresol and ether in sufficient quantity to preserve the liquid, and permitting the preserved exudate to age for substantially ten days to allow precipitation of fibrine proteins.

6. The process of producing anthrax aggressin consisting in injecting into the pleural cavity of a healthy animal a virulent culture of anthrax suspended in a liquid media in sufficient quantity to immediately infect a large area of the cavity and effect the death of the animal in from forty-eight to seventy-two hours; effecting the withdrawal of the liquid exudate from the cavity upon the death of the animal, heating the exudate in a water bath at substantially 55° C. to effect sterilization, allowing the heated exudate to cool and adding equal parts of tri-cresol and ether in sufficient quantity to preserve the liquid, permitting the preserved exudate to age for substantially ten days to allow precipitation of fibrine proteins, and decanting the liquid from the precipitate, centrifuging the clear liquid to throw off solids, and passing the remaining liquid through suitable filters.

In witness whereof we hereunto affix our signatures.

CHARLES E. SALSBERY.
HANS JENSEN.
GUY G. GRAHAM.